(No Model.)

W. J. HIELD.
SPLICE FOR ELECTRIC CONDUCTORS.

No. 464,022. Patented Dec. 1, 1891.

Witnesses.
C. E. Van Doren,
O. G. Hawley.

Inventor:
Willard J. Hield.
By Paul & Merwin Atty's

United States Patent Office.

WILLARD J. HIELD, OF MINNEAPOLIS, MINNESOTA.

SPLICE FOR ELECTRIC CONDUCTORS.

SPECIFICATION forming part of Letters Patent No. 464,022, dated December 1, 1891.

Application filed May 15, 1891. Serial No. 392,850. (No model.)

*To all whom it may concern:*

Be it known that I, WILLARD J. HIELD, of Minneapolis, in the county of Hennepin and State of Minnesota, have invented a certain Improved Splice for Electric Conductors, of which the following is a specification.

My invention relates to a metal splice especially adapted for use on trolley-wires of electric-railway systems; and the object which I have in view is to provide a splice which may be used in uniting the ends of a broken wire, which is easily applied, of low cost, and which will form no obstruction to the passage of the trolley.

My invention consists in a slender metal bar or length of wire of a somewhat greater diameter than the electric conductor-wire, the ends of the same being provided with longitudinal openings adapted to receive the ends of the conductor-wire and transoms, holes, or openings, through which the ends of the conductor-wires are passed after being bent and wherein said ends are riveted; and, further, my invention consists in various details of construction and in combinations hereinafter described, and particularly pointed out in the claims.

The invention will be more readily understood by reference to the accompanying drawings, in which—

Figure 1:
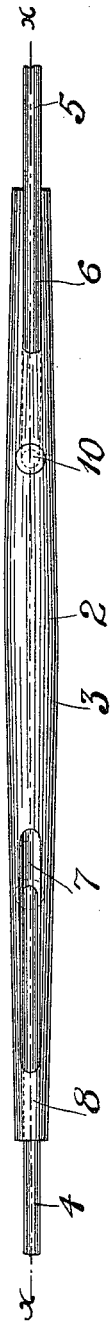
Figure 2:
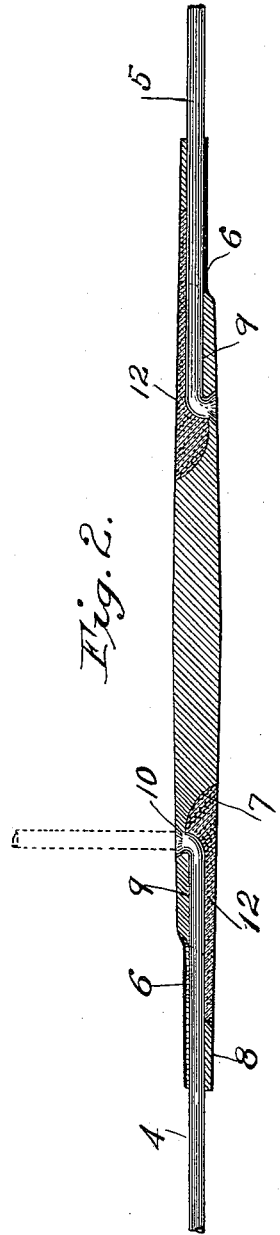

Figure 1 is a full view of a splice embodying my invention. Fig. 2 is a longitudinal cross-section of the same on the line $x\,x$ of Fig. 1.

The middle 2 of the bar 3 is of about twice the diameter of the conducting-wires, the ends 4 and 5 of which are secured in the splice. From the middle 2 the bar is tapered off to the ends, which are very little larger than the conducting-wire, the idea being to make as smooth a path as possible for the trolley. The ends of the bar are milled or cut out, as shown, from each side of the bars. A groove 6 is cut in each end, and on the opposite sides of the bar grooves 7 milled out, and, cutting through to the first grooves, thereby make a straight longitudinal hole or groove in each end of the bar for the admission of the ends 4 and 5. In this way a small bridge 8 is left at the end of the bar to prevent the springing out of the wire. The groove 7 is long enough to give a long bearing-surface 9 for the inner end of the conductor. The extreme end of each wire is bent or hooked, as shown, and passed through a transverse opening or hole 10. After being cut off quite close to the bar these ends are riveted and the holes being flared outwardly formed into countersunk heads thereon to prevent the pulling out of the wires. The ends or heads of the wires are filed off flush with the surface of the bar. The turns or bends in the wires being short, they are adapted to stand a great strain. At the point where the wires are headed the bar is large enough to leave metal on all sides of the grooves 7 to insure the strength of the device.

I strengthen and stiffen the splice by filling the grooves with solder 12, as indicated in Fig. 2, thereby practically making one piece of the wires and splice-bar 3. The bar is made of such length that the distance between the head-holes leaves plenty of wire for making the connection after allowing for the contraction or sagging of the line-wire.

Having thus described my invention, I claim as new and desire to secure by Letters Patent—

1. The splice-bar having longitudinal openings in its end adapted to receive the ends 4 and 5 of the conductor-wire and transverse head-holes in which the bent ends of said conductor-wires are secured, substantially as described.

2. The combination, in a device of the class described, of the conductor-wires 4 and 5, with the bar 3, having taper ends provided with longitudinal openings and transverse flaring holes provided therein, said wires being bent and passed through said openings and riveted therein, as described.

3. The bar 3, having tapering ends with the grooves 6 and 7 therein, the bridge parts 8, and the transverse flaring holes, substantially as described.

4. The combination, with the ends of the conductor-wire, of the tapered bar 2, the grooves 6 and 7 therein, portions 8, and transverse holes extending into said grooves 7, said ends of the conductor-wire being bent and riveted therein and the wires and splice-bar being firmly secured together by solder provided in said grooves, substantially as described.

In testimony whereof I have set my hand this 12th day of May, 1891.

WILLARD J. HIELD.

In presence of—
F. S. LYON,
C. G. HAWLEY.